Fig. 1.

INVENTORS:
ROBERT J. CHARLSON
NORMAN C. AHLQUIST
BY
ATTORNEYS

INVENTORS
ROBERT J. CHARLSON
NORMAN C. AHLQUIST
BY
Christensen, Sexton, & Matthews
ATTORNEYS

United States Patent Office 3,563,661
Patented Feb. 16, 1971

3,563,661
INTEGRATING NEPHELOMETER
Robert J. Charlson and Norman C. Ahlquist, Seattle, Wash., assignors, by mesne assignments, to The Battelle Development Corporation, Columbus, Ohio, a corporation of Delaware
Continuation-in-part of application Ser. No. 729,812, May 16, 1968. This application Aug. 29, 1969, Ser. No. 854,214
Int. Cl. G01n 21/00, 21/12, 21/21
U.S. Cl. 356—103                                                15 Claims

ABSTRACT OF THE DISCLOSURE

An improved integrating nephelometer applicable for mobile or static monitoring of the atmospheric extinction coefficient by measuring the extinction coefficient due to the scatter of light in a sample of atmospheric aerosol. A flashlamp aims a light pulse directly at a reference phototube through the sample, and indirectly at a measuring phototube which has a predetermined beam pickup. The intensity of the light pulse reaching the reference phototube establishes a standard against which the intensity of the light pulse scattered by the aerosol may be measured. The two phototube output signals are integrated, then passed through an analog device which divides the measuring phototube signal by the reference phototube signal to eliminate variations in readings due to fluctuations in light intensity. The analog device output is a voltage pulse which is amplified and passed through a delayed gate circuit which allows the light pulse to be completed and the analog divider to stabilize. The delayed gate circuit samples and holds the voltage level of the pulse, producing a DC signal which is averaged to provide an indication directly proportional to the extinction coefficient due to light scattering. Secondary indicating scales are provided for mass concentration and visual range. Modifications allow use of the nephelometer for measuring the wavelength dependence of the extinction coefficient due to light scattering and for the measurement of the properties of deliquescent aerosols.

BACKGROUND OF THE INVENTION

This invention relates generally to an integrating nephelometer and, more particularly, to an integrating nephelometer using a two-beam optical system.

This application is a continuation-in-part of application Ser. No. 729,812 filed May 16, 1968, entitled "Integrating Nephelometer" by Robert J. Charlson and Norman C. Ahlquist.

The invention described herein was made in the course of, or under, a grant from the U.S. Public Health Service, Department of Health, Education and Welfare.

The spatial distribution, including the kind and quantity, of atmospheric pollutants in the vicinity of urban complexes or otherwise has been difficult to evaluate. These pollutants generally comprise an aerosol, which may be defined as a colloidal suspension of liquid or solid particles in the air. For horizontal and vertical profiling of the aerosol, large horizontal and vertical scales are normally required which include a plurality of static instruments and towers or mobile instruments. These currently available instruments lack desired versatility and sensitivity necessary for meaningful evaluation of the distribution.

The visual quality of air, including visual range and color, is related to air pollution by atomspheric aerosol. Increases in atmospheric aerosol provides a degradation in visual quality which manifests itself in reduced visibility through the atmosphere. Thus, previous methods have involved readings by human observers of visual range by making a number of observations of a distant object through the atmosphere.

In order to have a more exact criterion of visual quality the extinction coefficient due to light scattering may be measured. The light scattering coefficient is defined in "A New Instrument For Evaluating the Visual Quality of Air" by Ahlquist and Charlson, Journal of the Air Pollution Control Association, volume 17, No. 7, July 1967. The light scattering coefficient may be determined by implementing the following attenuation equation:

$$I/I_0 = e^{-bx}$$

where:

$I_0$ = intensity of light prior to entering an atmospheric path.
$I$ = intensity of light after passage through an atmospheric path of distance $x$.
$b$ = extinction coefficient.

The quantity $b$, is made up of two components, $$b = b_{abs} + b_{scat}$$

where:

$b_{abs}$ = extinction coefficient due to absorption of light by particles or gases.
$b_{scat}$ = extinction coefficient due to scatter of light by particles or gases.

In general, it is possible to assume that $b = b_{scat}$ unless, of course, substantial quantities of light absorbing gases (e.g. $NO_2$) or particles (e.g. soot) are present. For most atmospheric aerosol, $b_{scat}$ is estimated to be about $10^2$ larger than $b_{abs}$. Integrating nephelometers have been built for measuring the scattering component of extinction coefficient, $b_{scat}$. Such devices optically integrate light scattered in all angles by the aerosol particles to obtain a value of $b_{scat}$ and are to be distinguished from devices which measure light scattering only at a discrete angle or angles. The term light scattering as used hereinafter is thus defined as that measured by taking the integral thereof over all scattering angles. The advantage of the nephelometer over other devices for measuring the visual quality of air is that the nephelometer takes a reading of the coefficient $b_{scat}$ at what may be considered a point in space and in time.

Since the integrating nephelometer may be designed to provide an output proportional to the extinction coefficient due to scatter $b_{scat}$, it is then a simple matter to relate this coefficient to spatial distribution of atmospheric aerosol by taking a plurality of readings at different points in space and time. It has been shown that the extinction coefficient due to light scattering can also be simply related to both visual range and to the mass of aerosol per volume of air by simple formulae.

Integrating nephelometers have been known for some time and were first devised as an aid to the determination and control of visual range. The early devices were seriously limited because they utilized the human eye as a sensor. Subsequently, they were modified to incorporate a multiplier phototube as the primary sensing element. All such instruments left much to be desired in the way of sensitivity, versatility and mobility. Calibration was also difficult. The integrating nephelometer according to the present invention avoids the disadvantages of the heretofore known devices and is particularly adapted for mobile or airborne monitoring of atmospheric aerosol.

As mentioned, light scattering by atmospheric aerosol is responsible not only for decrease in the visual range but also for at least some of the color of objects which are viewed from a distance. Perhaps the best example of such a chromatic effect can be observed at sunset; if a large quantity of aerosol is present, the sun's disc usually appears reddish in color, while in cleaner air the sun maintains a more nearly white appearance. Likewise, the presence of heavy pollution in cases of low humidity often results in a brown appearance, sometimes attributed to light absorption by $NO_2$.

Therefore, it would seem from such empirical data that there is a relation between the value of the extinction coefficient due to light scattering and the wavelength of light passing therethrough. The classical study of Lord Rayleigh predicts a relationship only for a limited case, maintaining that the extinction coefficient would depend on the inverse fourth power of the wavelength. For such cases, the size of the particles forming the aerosol would have to be less than $1/10$ the wavelength of the incident light and have an index of refraction near that of the surroundings. Thus, the theory of Rayleigh is primarily applicable to light scattering by gases and sub-wavelength sized particles.

In practice, atmospheric aerosol approaches but does not reach Rayleigh scatter. Rather, the wavelength dependence of the extinction coefficient due to light scattering has been empirically described by analogy to the relation used for Rayleigh scatter:

$$b_{scat} \alpha \lambda^{-\alpha}$$

where $\lambda$ is the wavelength of light incident on the sample and $\alpha$ is an empirically determined exponent. In the absence of aerosols, the exponent $\alpha$ equals 4, and the relation above reduces to that of Rayleigh scatter due to the small size of air molecules.

Previously, instruments for monitoring particulate pollution have been able to determine the exponent $\alpha$ only for long atmospheric paths. The difficulty with this approach is that any meaningful determination of the coefficient $b_{scat}$ must be made at essentially a point if the value of $b_{scat}$ is to be related to spatial distribution and other quantities of interest with respect to atmospheric aerosol. Thus, if it would be possible to measure $\alpha$ at a point, it would be possible to study the correlation of $b_{scat}$ as it depends on $\lambda$ to other aerosol characteristics, such as size distribution, measured in the same air sample.

Therefore, a primary object of this invention is to provide an improved integrating nephelometer.

Another object of this invention is to provide an integrating nephelometer that has a high degree of sensitivity.

Still another object of this invention is to provide a versatile integrating nephelometer that may be readily adapted for mobile or airborne monitoring of atmospheric aerosol and that can be universally used under varying conditions and locations with results that can be correlated.

A further object is to provide a compact, integrating nephelometer that is simply and ruggedly constructed, easy to operate, and that can be accurately calibrated in operation.

The penultimate object of this invention is to sense chemical reactions in situ occurring in the condensed part or phase of an aerosol.

The foregoing and other objects and advantages of the invention will be apparent to those skilled in the field to which it pertains by perusal of the following description and accompanying drawings, all of which are offered by way of example only and not in limitation of the invention, the scope of which is defined by the appended claims rather than by any detailed description.

SUMMARY OF THE INVENTION

Briefly, an integrating nephelometer according to the present invention comprises means defining a sample volume of fluid and means including a source of illumination for producing a light pulse to thereby illuminate the sample volume. A detector receives scattered light from the light pulse and produces an electrical signal in response thereto. Also included is means for producing a reference signal and means utilizing the reference signal to compensate for variations in the electrical signal from the detector caused by variations in the intensity of each individual light pulse. Electronic means are provided for comparing the signal produced by the detector with the reference signal to thereby indicate the light scattered by atmospheric aerosols in the sample.

BRIEF DESCRIPTION OF THE DRAWINGS

FIGS. 2($a$) and 2($b$) are vertical and horizontal profile, respectively, of the spatial distributions of air pollution taken with the integrating nephelometer over typical urban areas;

FIG. 4($a$) is a calibration chart for the wavelength-sensitive integrating nephelometer and FIG. 4($b$) is a chart of the wavelength sensitive integrating nephelometer outputs under experimental conditions;

DESCRIPTION OF A PREFERRED EMBODIMENT

Figure 1:
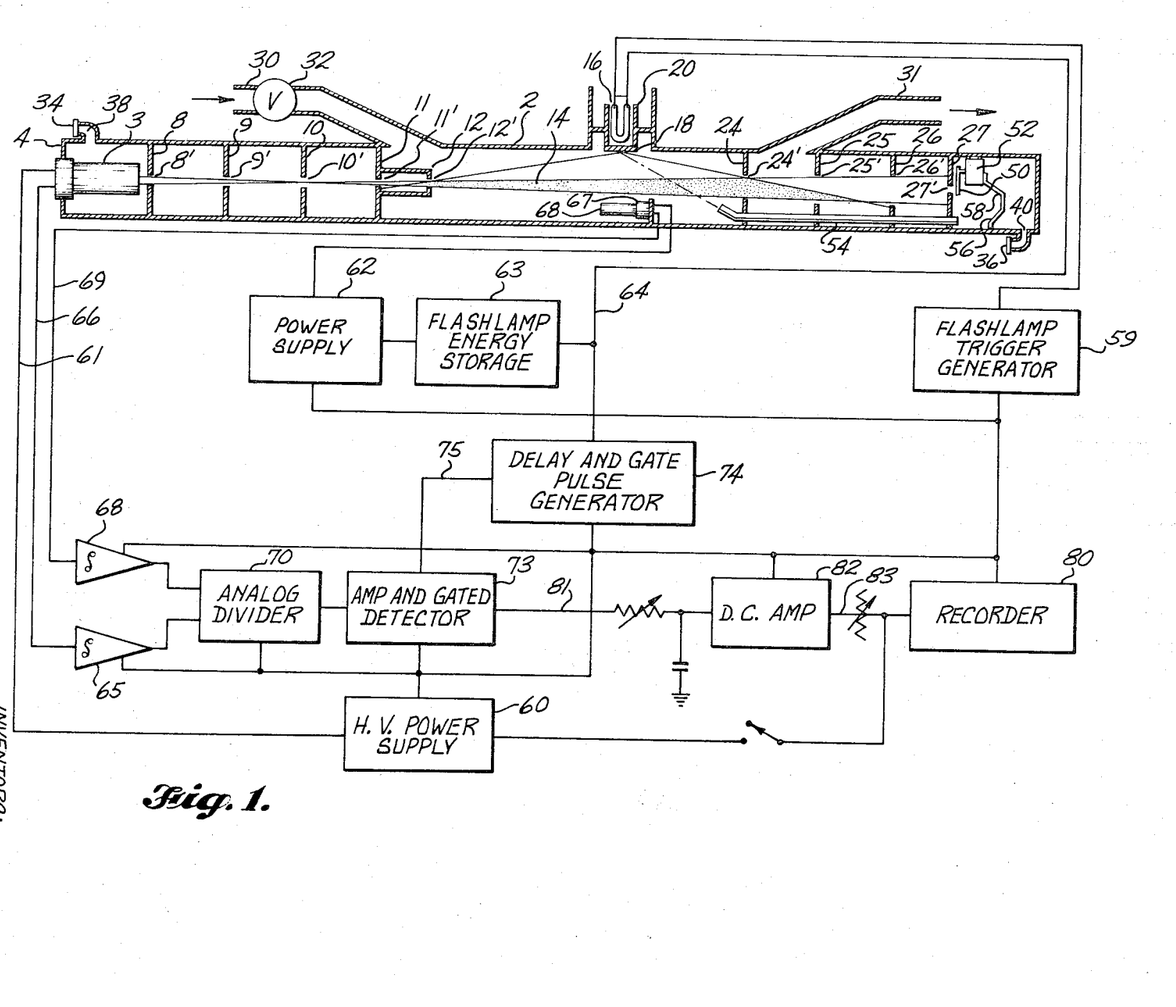
FIG. 1 is a schematic sectional view of the integrating nephelometer according to the present invention, including a schematic diagram of the optical and electronic systems.

The integrating nephelometer illustrated in FIG. 1 is primarily designed for the study of the spatial distribution of atmospheric aerosol. The instrument includes an optical system and an electrical system.

The optical system is disposed in a tubular container which may be of aluminum or other suitable material. In the preferred embodiment of the invention, the container 2 comprises a 130 cm. length of 7.5 cm. diameter thin wall aluminum tubing. A multiplier phototube 3, such as a ten stage commercially available Amperex XP 1010 is mounted in the forward end 4 of the container 2.

A plurality of discs 8, 9, 10, 11 and 12 are disposed in the container 2 and are arranged to define a collimator and light trap. The discs 8, 9, 10, 11 and 12 define a series of apertures 8', 9', 10', 11' and 12' which are optically aligned with the phototube 3. A cone of observation 14 is defined by the disc 8 and the disc 11 and does not intersect the edges of apertures 9', 10' and 12'. Discs 9, 10 and 12 serve as light traps and cast shadows on any surfaces seen by the phototube 3. The inside surfaces are preferably all coated with flat black paint to further reduce the effect of any reflected light.

The air sample is illuminated by a light source 16 and opal glass diffuser or window 18 disposed in a suitable housing 20 and located in the center section of the tubular container 2. The light source 16 may, for example, consist of a xenon flash-lamp which produces a cosine emission characteristic by means of the opal glass diffuser 18. The diffuser 18 also forms a seal to the sample chamber. The fact that this geometry integrates over all scattering angles has been illustrated in the book "Vision Through the Atmosphere" by W. E. K. Middleton (1963).

A second series of discs 24, 25, 26, and 27 are disposed in the rear portion of the tubular container 2 and are separated from the discs 8, 9, 10, 11 and 12 by the central section of container 2. The disc 24 defines an aperture 24' which further defines the sample volume 14. Discs 25 and 26 serve as a light trap and define apertures 25' and 26'. The sizes of apertures 25' and 26' are determined by the amount of divergence in the observing beam of the phototube 3. The discs 27 is in the shadow of disc 24, 25, and 26 and is coated with flat black paint to further prevent direct reflection of light in the direction of the phototube 3.

An inlet duct 30 is provided for admitting air or other fluid to be sampled into the central sampling section and an outlet duct 31 is provided for discharging the sampled air after passing through the central section. Air flow through the system during the sampling operation is on a continuous basis. However, when calibrating the instrument, inlet duct 30 is closed as will be more fully explained hereinafter.

The nephelometer in FIG. 1 is provided with recorder 80 which has a scale reading directly in values of the extinction coefficient due to light scattering $b_{scat}$. The primary standard for nephelometer calibration is the Rayleigh scattering of particle-free gases such as air, $CO_2$, and dichloro-difluoromethane ($CCl_2F_2$). Rayleigh scattering, as noted above, assumes that the extinction coefficient due to light scattering varies as the inverse fourth power of the light wavelength. Initial calibration of the nephelometer is made in the laboratory using controlled sources of the above-noted particle-free gases. Field calibration, however, presents another problem. Although particle-free air is readily reproducible under field conditions, $CCl_2F_2$ or $CO_2$ are not. Therefore, a secondary standard is provided in the instrument of FIG. 1.

The extinction coefficient $b_{scat}$ of air has a known, relatively small value, whereas the extinction coefficient $b_{scat}$ of $CCl_2F_2$, for example, has a known but relatively higher value. Thus, two points on the scale reading directly in the extinction coefficient $b_{scat}$ can be provided for field calibration if material or devices which provide $b_{scat}$ signals equal in magnitude to those of these gases can be obtained.

A valve 32 disposed in the inlet duct 30 shuts off the sample air stream. Glass fiber filters 34, 36 are disposed adjacent inlets 38 and 40 to provide a source of clean air purging the instrument of particle samples during a first calibration step and for keeping the phototube and light traps clean during operation. The inlets 38 and 40 are disposed one at each end of the container 2. The sample fluid and purging air are exhausted through duct 31. Air flow for purging the instrument is provided by movement thereof through the atmosphere or by means of a small air pump when the instrument is stationary. When valve 32 is closed, the continuous purge air flow fills the instrument with particle-free air. At this time, a first point on the $b_{scat}$ scale in recorder 80 may be checked in the field.

The disc 27 defines a 1 mm. aperture 27' which is covered by a shutter 50. The shutter 50 is opened by means of a solenoid 52. For obtaining a second calibration point on the $b_{scat}$ cale, a light pipe 54 directs light to a mirrored surface 56 to illuminate a white surface 58. The white surface 58 is viewed by the phototube 3 and the signal thus entered into the phototube is proportional to a $b_{scat}$ about equal to that of $CCl_2F_2$. This reading will usually appear about half-scale on the most sensitive range of the nephelometer and is readily obtained without the use of a primary gas. Thus, these two points—the clean air signal and a half-scale signal equivalent to particle-free $CCl_2F_2$—provide a rapid check of calibration in the field, usually in less than one minute.

The electronic system includes a high voltage power supply 60 having square wave converters and regulators to supply $-1500$ to $-1800$ volts to the phototube 3 through lead 61. The high voltage power supply 60 is well regulated and on log response is controlled by the analog signal to the recorder 80 to obtain a non-linear response when desired. The main power supply 62 contains a square wave converter to supply 450 volts to the flashlamp energy storage circuit 63. Resonant charging is employed to produce 800 volts across a 2 microfarad capacitor conducted to the flashlamp by lead 64. This charging method has high efficiency and results in a current requirement of only 0.9 ampere total at 12 volts DC for the entire instrument exclusive of the recorder. The flashlamp trigger generator 59 pulses the flashlamp 16 at any desired timed intervals.

The circuit, which is a two-beam system, compensates for the short-term noise and long-term drift in sensitivity caused by variations in intensity of the flashlamp 16. The output of the phototube 3 is a pulse of current about 20 microseconds long. The pulse of current is conducted to an integrator circuit 65 with a time constant of 250 microseconds by means of a lead 66. The integrator circuit 65 includes a range switch which varies the value of the integrating capacitor.

A reference phototube 67 is disposed in the central portion of the sample chamber 2 opposite the light source 16. A wratten number 47 blue filter 68 covers the tube to more closely match its spectral response to that of the combination of the multiplier phototube 3 and light scattering by air. Power (250 volts) is supplied from power supply 62 and the output of phototube 67 is conducted to an integrator circuit 68 by means of a lead 69. The outputs of integrator 65 and 68 drive an analog division circuit 70 which produces an output signal corresponding to the ratio of the signal pulse to the reference pulse. Thus, any fluctuations common to both phototube 67 and multiplier phototube 3, for example from flashlamp 16, are eliminated.

The ratio signal is delivered to an amplifier and gated detector 73. The amplifier circuit includes an electronic switch (not shown) which is closed from 50 to 150 microseconds after the start of a flash by means of a delay and gate pulse generator 74 which is connected to the amplifier and gated detector 73 by means of a lead 75. The resultant delay allows the flash to be completed and the analog divider circuit 70 to stabilize. The resulting DC voltage output of the amplifier and gated detector 73 is coupled to a recorder 80 by means of a DC amplifier circuit 82 through leads 81 and 83. A DC bias is inserted in amplifier 82 to block out the background signal from light reflected by the walls of the nephelometer.

Air flow through the nephelometer is conveniently achieved by placing it either on the roof of an automobile or in an appropriate location on an aircraft, such as on the wing. The externally mounted glass fiber filters 34 and 36 provide clean purge air from the same motion. For static operation, a small axial-flow fan can be mounted on the exhaust 31. No adjustments to the optical unit are necessary during a measurement so that data might be taken continuously from inside a vehicle. Calibration checks may be made whenever desired. However, the stability of the zero and gain of the instrument is such that at most one or two field calibrations suffice per hour of operation. The absolute accuracy of the instrument for measuring the extinction coefficient due to scattering is probably of approximate magnitude $\pm 10\%$, depending on the accuracy of the calculated value for the Rayleigh extinction coefficient for particle-free air and other primary calibration sources. The signal-to-noise ratio at an extinction coefficient $b_{scat}$ of $5 \times 10^{-4}$ m.$^{-1}$ is more than 25 with a two-second time constant and is 20 with a ½ second time constant. A one-second time constant corresponds to about 30 meters (100 feet) at a speed of 100 km./hour (60 m.p.h.).

Figure 2A:
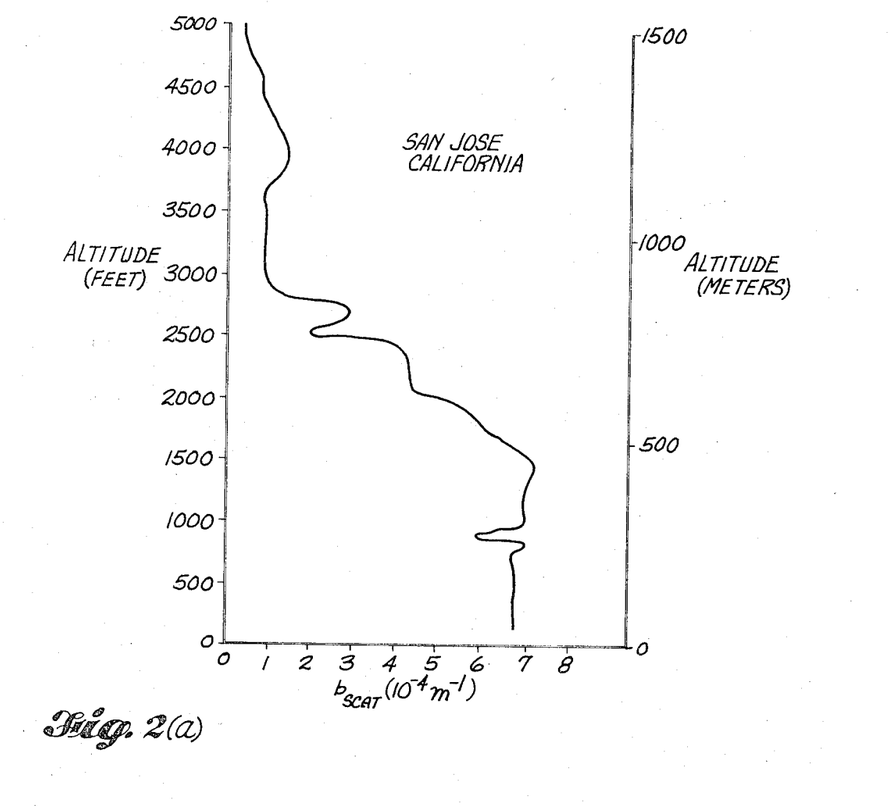
Figure 2B:
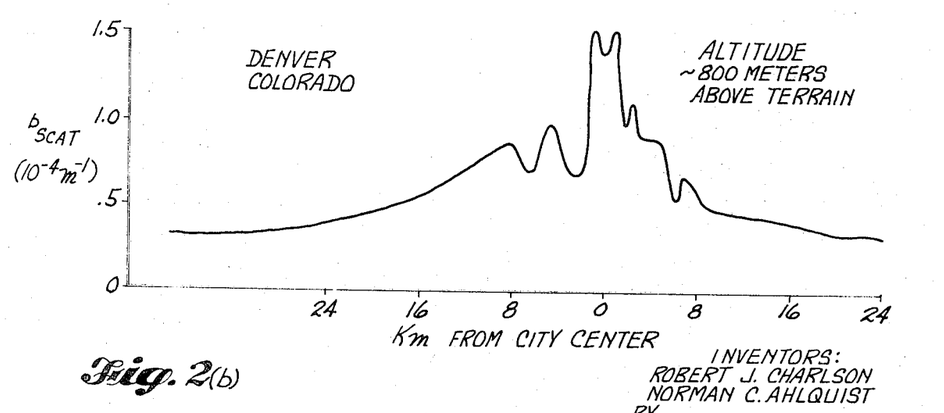

FIG. 2 shows experimentally obtained profiles of spatial distributions of atmospheric aerosol taken with the integrating nephelometer being mounted in an aircraft. FIGS. 2(a) and 2(b) were taken at two different times and at two different places. FIG. 2(a) is a vertical profile taken over an airfield in San Jose, Calif. Because of the short response time of the integrating nephelometer according to FIG. 1, the observer was able to take a plurality of readings within a very short time span in order to obtain the vertical profile without a significant change in the spatial distribution of the aerosol. FIG. 2(b) shows a horizontal profile taken by flying over the city of Denver, Colo., again in a short time span, with the integrating nephelometer. FIG. 2 clearly shows the ability of the nephelometer to accurately determine the spatial distribution of air pollution, which in the case of FIG. 2(a) is heavy at low altitudes and progressively lighter at higher altitudes, and in FIG. 2(b) is predominantly centered above the city center tested.

Although the nephelometer in FIG. 1 gives speedy and accurate readings of the extinction coefficient $b_{scat}$ to thereby objectively determine the spatial distribution of atmospheric aerosol, the readings thus obtained have only been correlated with other, more traditional parameters of visual quality, such as visual or meterological range, or mass concentration of aerosol particles by application of an assumed wavelength of peak sensitivity of the nephelometer. It has long been known that visual range can be related to the scattering coefficient $b_{scat}$ at the wavelength of peak sensitivity by a simple formula, that is, $L_v = K_1/b_{scat}$, where $L_v$=visual range and $K_1$ is a constant.

Likewise, a relation has been proposed between mass concentration of aerosol and the scattering coefficient $b_{scat}$, that is, $MASS = K_2(b_{scat})$, where $MASS$= mass concentration in grams per cubic meter and $K_2$ is a constant. If the scattering coefficient $b_{scat}$ and the constants $K_1$ and $K_2$ could be accurately determined, then the usefulness of the integrating nephelometer could be greatly increased by placing secondary scales on the recorder 80 which are proportional to the desired quantities $L_v$ and MASS, within the accuracy inherent in the given relationships.

As noted above, the scattering coefficient $b_{scat}$ is expected to be wavelength dependent to a certain extent and a relationship has been proposed to relate $b_{scat}$ to wavelength. However, the exponent $\alpha$ in that relation has never, for want of a suitable instrument, been accurately determined for various atmospheric aerosols at a point in the spatial distribution thereof. Previously, the nephelometer shown in FIG. 1 has been assumed to have a peak sensitivity to light of a certain wavelength. This wavelength was assumed to be 460 nm. It was previously also necessary to assume a value for the exponent $\alpha$. Then, if it were desired to convert the readings of the extinction coefficient $b_{scat}$ taken with the integrating nephelometer to values corresponding to those observations of visual range taken with the human eye, whose effective peak wavelength has been accurately determined to be 550 nm., the aforesaid relation could be used. However, correlation between thus obtained values of visual range, by measuring the extinction coefficient $b_{scat}$, and values of visual range obtained by more traditional methods, has been limited to solely empirical means or to use of the above assumptions.

It is also desirable to measure $\alpha$ to provide an objective real-time measure of the wavelength dependence of the scattering coefficient $b_{scat}$ in a small volume of an air sample. It has heretofore only been possible to determine $\alpha$ by long path measurements, but the values thus obtained have little relation to other properties of atmospheric aerosol, such as mass concentration and type, which are measured at a point. Thus, a measurement of $\alpha$ at a point would allow correlation between the color of objects viewed through a distance and the particular aerosol whose wavelength dependence determines that color.

Figure 3:
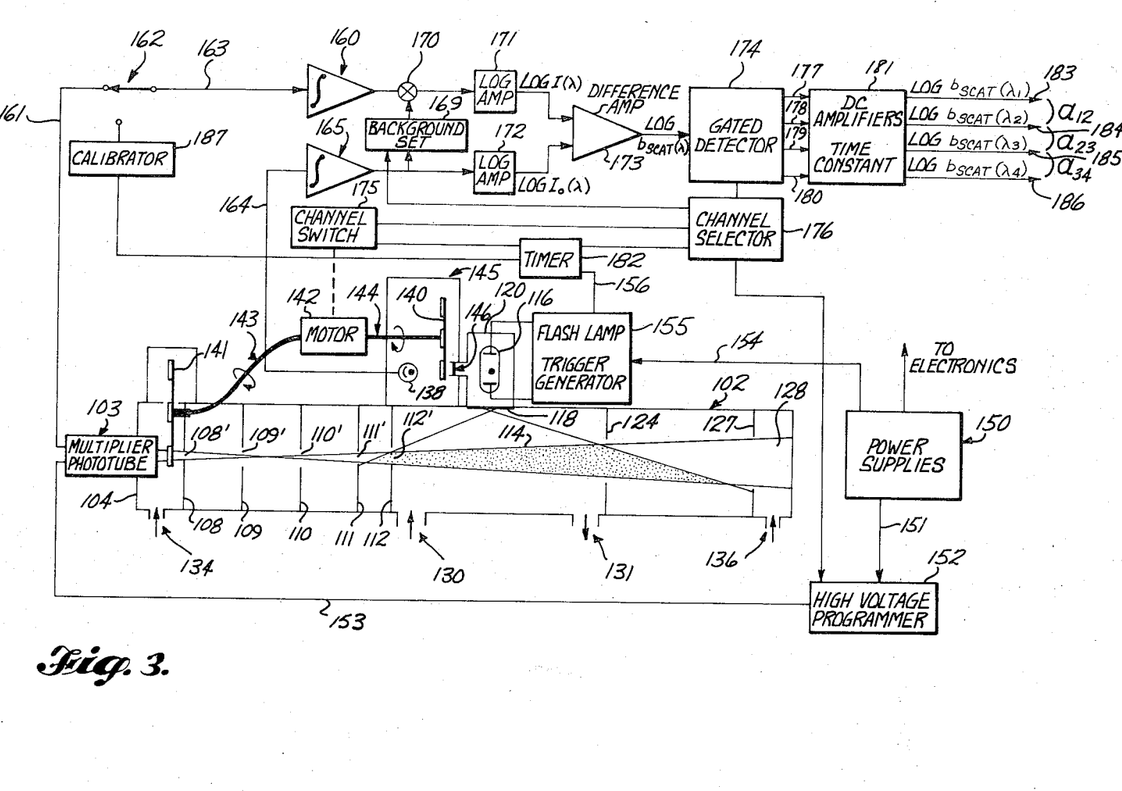
FIG. 3 is a schematic sectional view of the integrating nephelometer according to the present invention, as modified to be wavelength sensitive, including a schematic diagram of the optical and electronic systems.

Faced with this problem, the nephelometer of FIG. 3 was devised to test the validity of the aforesaid relation and, if valid, to determine the exponent $\alpha$ as accurately as possible for various atmospheric aerosols.

The basis of the modification rests in rewriting the aforesaid formula in the following form:

$$\alpha \cong \frac{-\Delta \log(b_{scat})}{\Delta \log \lambda}$$

It should be noted that the only quantities required for determination of $\alpha$ are the change in the log of the extinction coefficient $b_{scat}$ with the change in the log of the light wavelength. The nephelometer of FIG. 3 embodies these changes, which consist essentially of making the nephelometer of FIG. 1 sensitive to specific wavelengths.

The optical system is disposed in a tubular container 102 which may be of aluminum or other suitable material. In a preferred embodiment of the invention, the container 102 comprises a two meter length of 15 cm. diameter thin wall aluminum tubing. A multiplier phototube 103, such as a 14 stage commercially available RCA type 6810A is mounted in the forward end wall 104 of the container 102.

A plurality of discs 108, 109, 110, 111 and 112 are disposed on the container 102 and are arranged to define a collimator and light trap. The discs 108–112 define a series of apertures 108′, 109′, 110′, 111′ and 112′ which are optically aligned with the phototube 103. A cone of observation 114 is defined by the disc 108 and the disc 111 and does not intersect the edges of apertures 109′, 110′ and 112′. Discs 109, 110 and 112 serve as light traps and cast shadows on any surfaces seen by phototube 103. The inside surfaces are preferably all coated with flat black paint to further reduce the effect of any reflected light. Sample air is illuminated by a light source 116 and an opal glass diffuser or window 118 disposed in a suitable housing 120 and located in the center section of the tubular container 102. The light source 116 may, for example, consist of a xenon flashlamps which provides a cosine emission characteristic by means of the opal glass diffuser 118. (The diffuser 118 also forms a seal for the sample chamber.) The flashlamp 116 must have a much higher light intensity than the lamp 16 used in the integrating nephelometer of FIG. 1, due to the optical filters hereinafter to be described and the slower repetition rate of measurement. A suitable flashlamp would be a Sylvania type R4336.

A second series of discs 124–127 are disposed in the rear portion of the tubular container 102 and are separated from the discs 108–112 by the central section of container 102. Discs 124–127 serve the identical function as discs 24–27 of the FIG. 1 nephelometer and will not be described in detail. Likewise, a secondary standard apparatus 128 may be provided adjacent disc 127 which serves the identical function of nephelometer calibration as does the secondary standard in FIG. 1 comprising elements 50 to 58.

An inlet duct 130 is provided for admitting air or other fluid to be sampled into the central sampling section and an outlet duct 131 is provided for discharging the sampled air after passing through the central section. Air flow through the system during the sampling operation is on a continuous basis. As before, clean purge air and a source of air for nephelometer calibration is obtained by two auxiliary inlets and outlets 134 and 136 which are operated in conjunction with suitable valve means during calibration.

To this point, the optical system has been virtually identical to that used in the nephelometer of FIG. 1. To make the nephelometer wavelength sensitive, filter wheels 140 and 141 are interposed in the optical path of both the multiplier phototube 103 and a reference phototube 138. Each filter wheel 140 and 141 has placed therein a plurality of filters, each one being designed to screen all light but that of a certain narrow band of wavelengths. Only one filter of each wheel will be interposed in the optical paths of the phototubes 103 and 138 at any given point in time. The filter wheels 140 and 141 are coupled to a common driving motor 142 by means of flexible shafts 143 and 144. In a preferred embodiment, motor 142 is a 30 r.p.m. synchronous AC motor and the filter wheel 141 provides wavelength discrimination by including four narrow band-pass interference filters.

Reference phototube 138 is mounted in a chamber 145 along with filter wheel 140 adjacent container 120, and light communication therebetween is effected through an optical window including an opal glass diffuser 146. The filters in filter wheel 140 are especially chosen to match the response of reference phototube 138 to the combined response of multiplier phototube 103 and the filters in filter wheel 141.

The electronic system includes a power supply 150 having a low voltage biasing output to the electronic circuitry hereinafter to be described and a first high voltage output suitable for application to the multiplier phototube through a lead 151, a high voltage programmer 152, and a lead 153. The high voltage programmer 152 adjusts the high voltage supplied to the multiplier phototube 103 to equalize the response thereof to the various wavelengths. Power supply 150 also has a second high voltage output which is applied by means of a lead 154 to flashlamp trigger generator 155 whose output is coupled to the light source 116. In this case, resonant charging is utilized in power supply 150 to produce 2400 volts across an 8 microfarad capacitor.

Flashlamp trigger generator 155 discharges this capacitor into flashlamp 116 at desired intervals according to a control signal on its input lead 156.

The electronic system, which is a two-beam system, compensates for noise and drift in sensitivity caused by variations in intensity of the flashlamp 116. The output of the phototube 103 is a current pulse of about 70 microseconds duration which is conducted to an integrator circuit 160 by means of a lead 161, a switch 162, and a lead 163. The output of reference phototube 138, which may comprise a commercially available type 1P39 vacuum photodiode, is coupled by means of a lead 164 to a second integrator circuit 165.

As can be noted from this description, the modifications to the optical system of the integrating nephelometer provide a plurality of wavelength channels for the measurement of the extinction coefficient $b_{scat}$ for a single air sample. The number of channels corresponds to the number of filters in filter wheels 140 and 141, and switching between channels is controlled by means of an inverter in power supply 150, not illustrated, which supplies switching pulses to the driving motor 142.

In the electronic system, the outputs of integrator 160 are connected through a summing circuit 170 to a first log amplifier 171. The output signal of integrator 165 is coupled directly to the input of a log amplifier 172 and to the summing circuit 170 through a background set circuit 169 hereinafter to be described.

The outputs of log amplifiers 171 and 172 are coupled to inputs of a difference amplifier 173 whose output signal serves as the input to a gated detector circuit 174. Gated detector 104 is under control of a channel switch 175 and a channel selector 176. Channel switch 175 is in turn directly responsive to the position of driving motor 142.

Gated detector 174 provides an output corresponding to the observed $b_{scat}$ of each channel. In a preferred embodiment, four such channels are provided and the outputs thereof appear on leads 177–180. The signals are coupled to separate delay networks and DC amplifiers 181 to provide four DC output voltages on leads 183, 184, 185 and 186 suitable for recording and further calculation.

In operation, the output pulse from multiplier phototube 103 is integrated by integrator circuit 160 with a time constant of 1000 microseconds. The output of integrators 160 and 165 are passed through log amplifiers 171 and 172 to provide output signals respectively proportional to the log of the intensity of scattered light at a given wavelength and the log of the intensity of the incident light at a given wavelength.

Log amplifiers 171 and 172 may each comprise a transistor in a non-linear feedback path about an operational amplifier. The transistors may be located in a single integrated circuit device including an active temperature regulator to maintain the chip temperature at a predetermined value, such as 120° C. Zero offset in the outputs of the operational amplifiers which would cause errors at low input currents are avoided by chopper stabilization.

The difference amplifier 173 effectively takes the ratio of the two phototube output signals, since the difference of two logarithms provides their ratio. The difference signal from difference amplifier 173, which is proportional to $b_{scat}$, is conducted to one of four sample-and-hold circuits in gated detector 174 which are under direct control of channel selector 176. Each sample-and-hold circuit may comprise a field effect transistor switch and storage capacitor. In channel selection, the inverter in power supply 150 moves the shaft of motor 142 to a particular position so that one of the filters in filter wheels 140 and 141 is placed between the flashlamp 116 and the reference and multiplier phototubes 138 and 103. Suitable sensing means detect this motor position and accordingly adjust the channel switch 175 so that its output denotes which one of the four channels is in use. The output of channel switch 175 is connected directly to channel selector 176 and operates to adjust background set circuit 173 and high voltage programmer 152 in a manner to be described. The output of channel switch 175 is also connected to a timer circuit 182 which includes a delay network providing first, gating of flashlamp trigger generator 155, and, second, delayed application of the switch 175 output to channel selector 176. This time delay is conveniently chosen to be 200 microseconds after the flash. At that time, channel selector 176 provides a signal to the gated detector 174 indicating which of the four sample-and-hold circuits is to be energized.

A DC voltage thus appears on one of leads 177 to 180 and is coupled to the appropriate DC amplifier and delay network in circuit 181. Each DC amplifier comprises a field effect transistor and an operational amplifier connected in a voltage follower configuration with an RC delay circuit in series with its input. The resultant DC output voltage appears on one of leads 183 to 186 and corresponds to the log of the extinction coefficient due to scattering $b_{scat}$ at the wavelength determined by filter wheels 140 and 141.

The response of the multiplier phototube-filter-flashlamp combination must be the same for all channels, and the back-ground balancing signal provided in background set circuit 173 must be adjustable for each channel since the light scattered by the walls of the optical unit is not necessarily equal for all wavelengths. Therefore, channel selector 176 controls the amplitude of both the background suppression signal from integrator 160 and the sensitivity of multiplier phototube 103 by supplying appropriate control signals to background set circuit 173 and high voltage programmer 152.

Finally, a calibrator circuit 187 is provided which may be switched to the input lead 163 of integrator 160 by means of switch 162. Calibrator circuit 187 allows accurate determination of the log constant of the recording system used by providing sample outputs corresponding to the 1, 2 and 5 points on a logarithmic scale from 0.2 to 200 units of signal.

Figure 4A:
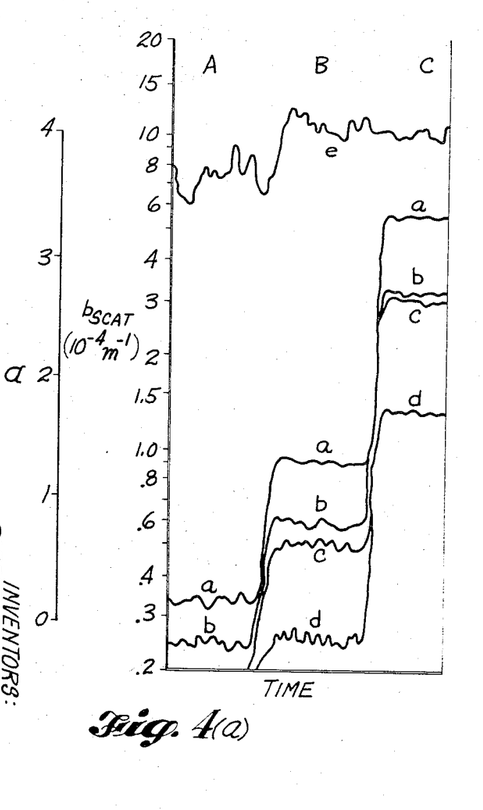

In calibration of the instrument in FIG. 3, the wavelengths of the four channels were taken to be 436 nm., 500 nm., 600 nm., and a broadband channel approximating the response of the integrating nephelometer of FIG. 1. As before, calibration was carried out by using particle-free gases including clean air, $CO_2$ and $CCl_2F_2$ which were expected to produce Rayleigh scattering in which the expected value of the exponent $\alpha$ would be 4. Further, the scattering coefficients of these gases at 550 nm. were known. The chart in FIG. 4(a) shows the result of that calibration. The curve $a$ represents the scattering coefficient $b_{scat}$ obtained with the 436 nm. channel, the curve $b$ that with the broadband channel, the curve $c$ that with the 500 nm. channel and the curve $d$ that with the 600 nm. channel. The curve $e$ represents a measured value of the exponent $\alpha$ obtained by subtraction of curve $c$ from curve $a$. Regions A, B, and C represent scattering mediums of clean air, $CO_2$ and $CCl_2F_2$, respectively.

The curves in FIG. 4(a) indicate only relative accuracy of the scattering coefficient $b_{scat}$. Absolute accuracy would depend on having an absolute value of $b_{scat}$ for a given Rayleigh scatter at a given wavelength. The chart on the instrument had previously been calibrated in terms of the known values of $b_{scat}$ for the given particle-free gases at an assumed wavelength. Since the actual wavelength sensitivity of the nephelometer was not known at calibration, the indicated values of $b_{scat}$ have relevance only with respect to each other.

FIG. 4(a) shows that, for a given type of scattering medium, such as a Rayleigh scatterer, the exponent $\alpha$ is indeed a constant. The trace of curve $e$ in FIG. 4(a) is centered about the value of 4. Yet, this tracing was made for three different scatterers of that type, air, $CO_2$, and $CCl_2F_2$, and at four different wavelengths. Thus, results indicate that despite these changes in wavelength, the exponent $\alpha$ is a constant. The validity of the wavelength-$b_{scat}$ relationship is thus evidenced, at least for a Rayleigh scatterer. A more important fact to be noted from the chart in FIG. 4(a) is that broadband integrating nephelometer of FIG. 1 has a peak sensitivity or effective wavelength which does not vary with changes in the fluid sample. It is to be noted that curve $b$ is always a certain proportional distance between curves $a$ and $c$ and that the peak sensitivity is approximately 490–500 nm.

Figure 4B:
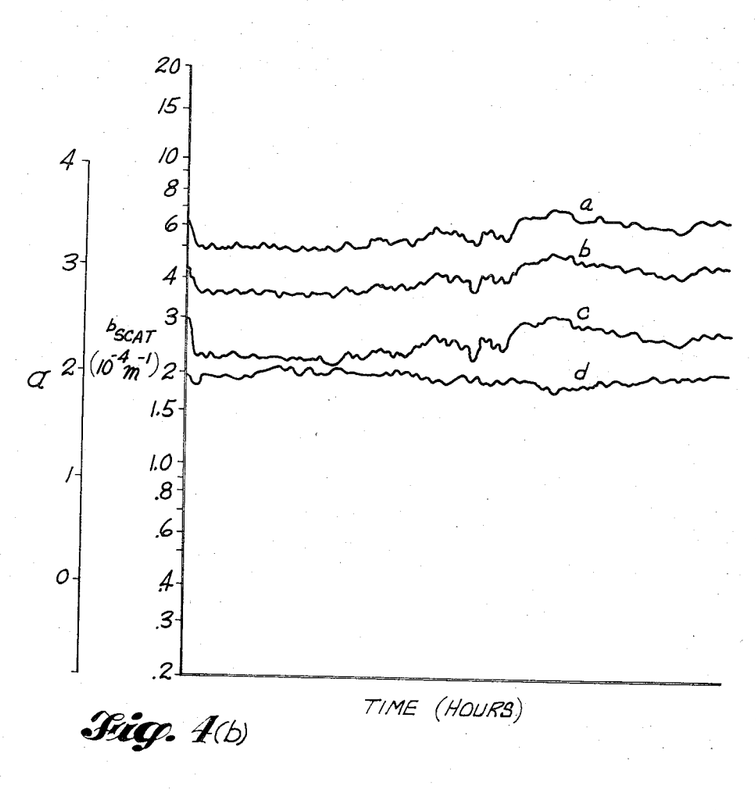

FIG. 4(b) together with FIG. 4(a) illustrates that there exists a unique relationship between the broadband scattering coefficient and the monochromatic scattering coefficient for each aerosol with a defined value of $\alpha$. The chart therein was taken for a typical atmospheric aerosol, not comprising a Rayleigh scatterer, over a period of about three hours. Curve $a$ represents the $b_{scat}$ for the 436 nm. channel, curve $b$ the 500 nm. channel, and curve $c$ the 600 nm. channel. Curve $d$ is a plot of the exponent $\alpha$, as obtained from the logs of $b_{scat}$ from the 436 and 500 nm. channels. Again, it is evident that for a given aerosol, the quantity $\alpha$ is constant and that the differing wavelength curves $a$, $b$, $c$ duplicate each and every variation in the scattering coefficient over the given time period.

FIGS. 4(a) and 4(b) verify, at least for certain aerosols, the validity of the relation between wavelength and extinction coefficient. Thus, with a nephelometer constructed as in FIG. 3, the value of the exponent $\alpha$ can be calculated for any given aerosol. Once this exponent is known, the relation can be used to convert the readings of the extinction coefficient $b_{scat}$ taken at one wavelength into corresponding readings at any other wavelength, such as 550 nm., the effective wavelength of the human eye, by the simple use of the wavelength-extinction coefficient relation.

FIGS. 4(a) and 4(b) also conclusively show that the integrating nephelometer as modified for wavelength sensitivity provides a means for continuously monitoring on a real-time basis, the wavelength dependence of light scattering as represented by the exponent $\alpha$ within a small volume of atmospheric aerosol. No previous instrument has been capable of continuously measuring $\alpha$, so useful in studies of aerosol, in this manner.

With the knowledge that the effective wavelength or peak sensitivity of the integrating nephelometer of FIG. 1 does not vary significantly with changes in the type of aerosol, the simpler instrument therein can be used for almost all atmospheric measurements by considering the output of that instrument to be a reading of the extinction coefficient $b_{scat}$ for a given wavelength. Further tests using the integrating nephelometer of FIG. 3 have shown that the exponent $\alpha$ has a modal value of approximately 1.8, with a range from 0.9 to 3.6 for 90% of atmospheric fluid samples tested. Thus, for most measurements, there is no need to calculate the exponent $\alpha$. The relation between wavelength and extinction coefficient $b_{scat}$ can be used, given this modal value of $\alpha$, to compute a fixed conversion factor between the output of the broadband integrating nephelometer of FIG. 1 and any other desired wavelength, such as 550 nm. Moreover, now that the exponent $\alpha$ has been accurately determined for various aerosols, and the validity of the relation between wavelength and extinction coefficient has been demonstrated, secondary scales corresponding to the visual range $L_v$ and mass concentration can be placed on the instrument. These quantities can now be related to the scattering coefficient at the effective wavelength of the integrating nephelometer by means of calculated relations $L_v = 4.7/b_{scat\ 500\ nm.}$ and $MASS = 3.8 \times 10^5\ (b_{scat\ 500\ nm.})$.

Figure 5:
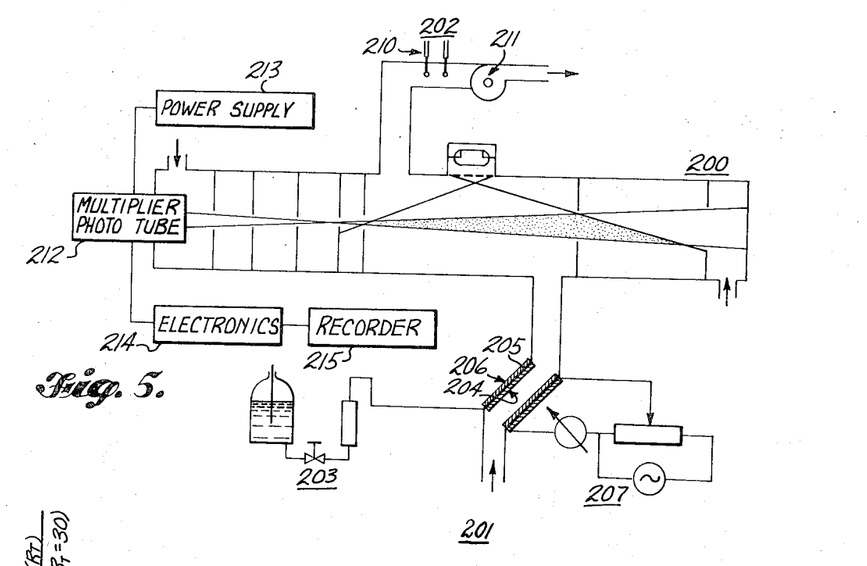
FIG. 5 is a schematic sectional view of the integrating nephelometer according to the present invention, as modified to indicate the effect of humidity on deliquescent aerosols.

The great versatility of the basic nephelometer of this invention is likewise illustrated by the modification taught in FIG. 5. A very important phenomenon of air pollution is that increase in light scattering, and thus decrease in visual quality, occurs when the relative humidity of the air increases, under certain conditions. It has been proposed that the reason for this phenomenon is due to deliquescence, which may be defined as the formation of a solution when a solid salt is exposed to liquid vapor at a partial pressure greater than that of the saturated solution of its highest hydrate. Particularly in terms of an atmospheric aerosol, deliquescence occurs when colloidially-suspended salt particles form solution droplets at a definite relative humidity. Because of the change in physical properties from particles to droplets, light scattering increases rather sharply and this increase can be measured in terms of the extinction coefficient $b_{scat}$. However, this phenomenon has not been readily susceptible of accurate determination because of a lack of suitable instrumentation for measuring the effects of deliquescence while precisely controlling the relative humidity within a small or point sample of the atmospheric aerosol. In other words, it has not previously been possible to make an in situ determination of the variation in $b_{scat}$ with respect to humidity changes in deliquescent aerosols.

The integrating nephelometer of this invention has sufficient sensitivity, range and stability so that it can be used for the study of this phenomenon. Now referring to the structure of FIG. 5, an integrating nephelometer is generically designated by the number 200 and is otherwise identical with the instrument illustrated in FIG. 1. The modifications consist essentially in the addition of a humidifier 201 to the aerosol inlet and a humidity monitoring device 202 to the aerosol outlet. The device 201 comprises a water flow regulator 203 whose stream is conveyed to a porous lining 204 inside an aluminum tube 204 adjacent the aerosol inlet. Wrapped about the tube 205 is an electric heating tape 206 which is connected to and supplied from a temperature regulating network 207. The humidity measuring device 202 may comprise a psychrometer 210 mounted in the aerosol outlet. A fan 211 is also mounted in that outlet to insure sufficient flow rate of the aerosol sample.

Humidity of the sample is varied by adding known amounts of water vapor to the air stream. The water is gravity fed from the water flow regulator 203 to the porous lining 204. A large wet area is thus exposed to the air stream, and the vaporization of the water may be enhanced by raising the temperature of the aluminum tube 205 by means of the heating tape 206.

The values of $b_{scat}$ thus obtainable with varying relative humidities of the air sample may be measured in a manner identical to that of FIG. 1. To this end, the nephelometer of FIG. 5 includes a multiplier phototube 212, a power supply 213, an electronic system 214 having also as input the reference signal from a reference phototube not illustrated, and a recorder 215.

If desired, the humidity measuring device 202 could comprise an automated dew-point hygrometer, and solid state electronic circuitry could be provided in which the readings thereof could be converted to relative humidity along with the corresponding value of $b_{scat}$.

Figure 6:
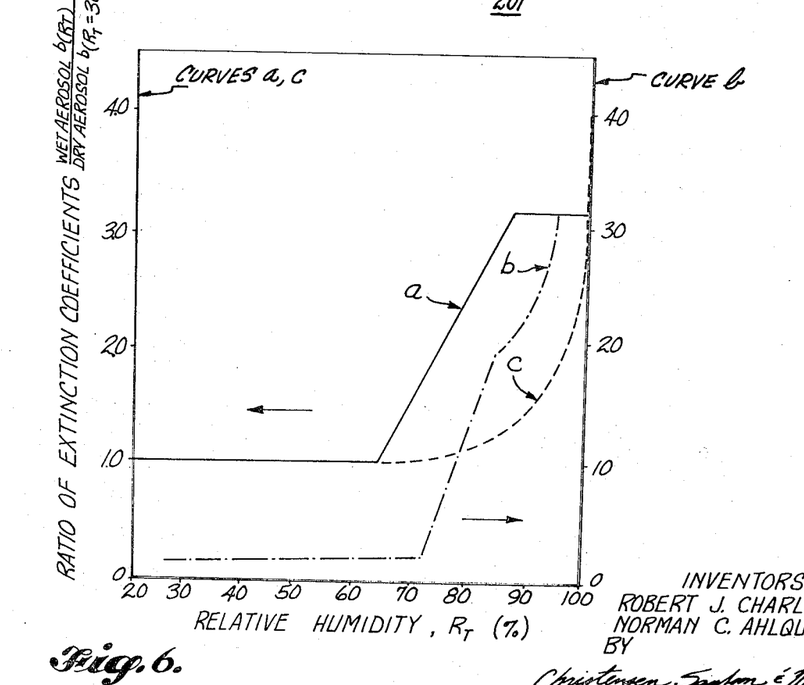
FIG. 6 is a chart showing the variation in extinction coefficient due to light scattering with relative humidity in a deliquescent aerosol.

The results of one experiment using the integrating nephelometer of FIG. 5 are shown by the chart of FIG. 6. The ordinate of this chart represents the ratio of the extinction coefficient $b_{scat}$ at a variable relative humidity to the extinction coefficient $b_{scat}$ at a relative humidity of 30%. Curve $a$ represents the readings obtained from a maritime aerosol, curve $b$ the readings obtained from a laboratory-produced NaCl salt aerosol and curve $c$ represents the readings obtained from a typical urban aerosol.

As can be noted, both the maritime and the laboratory aerosol exhibit a rapid change in $b_{scat}$ at a fairly definite relative humidity. Therefore, both these aerosols are expected to contain a large portion of deliquescent materials. However, the urban aerosol does not exhibit such behavior, but rather exhibits a drastic increase in the extinction coefficient only at extremely high relative humidities. Although this data is preliminary, it does indicate that perhaps salts do not form a significant portion of urban pollution. At the very least, the use of the integrating nephelometer in this manner can presently be used to predict the presence or absence of deliquescent materials in significant proportions in the atmosphere. As such materials are found, then it is possible to predict fog conditions, knowing the expected temperature changes and present relative humidity.

The integrating nephelometer can also be used in a similar manner to provide insight into the particular chemical compounds present in an aerosol by introducing a reagent vapor other than water vapor into the nephelometer chamber under controlled conditions. Thus, a change in the extinction coefficient $b_{scat}$ can be used to ascertain the presence of organic aerosols if $CCl_4$ vapor were used as a reagent, or the presence of some reactive compounds if HCl were used, and the presence of some acids if $NH_3$ were used.

The integrating nephelometer of this invention has unlimited versatility in the monitoring of atmospheric aerosols by means of detecting the extinction coefficient due to light scattering $b_{scat}$. While the invention has been described and illustrated with respect to specific embodiments thereof, it will be clearly understood by those skilled in the art that other embodiments and modifications may be resorted to without departing from the scope of the invention as set forth in the appended claims.

What is claimed is:

1. An integrating nephelometer for monitoring the visual qualities of an aerosol by determining the extinction coefficient due to light scattering thereof, comprising:
   (a) a housing which includes a chamber, an inlet means for introducing a sample of the aerosol into said chamber, and an outlet means for removing said sample from said chamber,
   (b) a light source which produces a light pulse of high intensity and of a cosine emission characteristic,
   (c) means within said housing which defines a view volume of said sample within said chamber, said view volume comprising a cone of observation and said cone of observation having an axis, and means positioning said light source such that the maximum of the cosine emission characteristic lies at right angles to the axis of said cone of observation.
   (d) trigger means controlling the production of said light pulse by applying a control signal to said light source while said sample is within said chamber,
   (e) means conducting said light pluse to said view volume within said chamber,
   (f) a first, highly-sensitive photoelectric detector, and means positioning said first photoelectric detector with respect to said housing so that said first photoelectric detector receives the portions of said light pulse which are scattered by said aerosol sample and which pass through the vertex of said cone of observation, whereby said first photoelectric detector produces a measuring signal in response thereto,
   (g) a second photoelectric detector receiving light directly from said light source and producing a reference signal in response thereto,
   (h) means for comparing said measuring signal with said reference signal to produce a comparison signal which is compensated for variations in intensity of said light source,
   (i) means sampling said comparison signal to produce a sample signal therefrom, and
   (j) indicating means responsive to said sample signal for indicating the desired extinction coefficient.

2. An integrating nephelometer as recited in claim 1 in which said comparing means comprises:
   (a) means for integrating said measuring and said reference signals from said first and said second photoelectric detectors, respectively, and
   (b) an analog divider having said integrated measuring and reference signals connected thereto and providing said comparison signal therefrom which is proportional to the ratio thereof.

3. An integrating nephelometer as recited in claim 1 wherein said light source comprises:
   (a) a xenon flashlamp, and
   (b) an opal glass diffuser conducting said light pulse from said flashlamp into said chamber.

4. An integrating nephelometer as recited in claim 1 wherein said first photoelectric detector comprises a multiplier phototube.

5. An integrating nephelometer as recited in claim 1, further comprising a means for secondary calibration thereof which comprises:
   (a) means for introducing into said chamber through said inlet means a particle-free fluid which is the same as the fluid within the aerosol to be sampled.

6. An integrating nephelometer as recited in claim 5 wherein said means for secondary calibration further comprises:
   (a) reflective means located in said housing within view of said first photoelectric detector, said reflective means having an emission characteristic approximating that of a particle-free fluid having a relatively high extinction coefficient, and
   (b) means for conducting said light pulse to said reflective means.

7. An integrating nephelometer as recited in claim 6, wherein said fluid comprises air and said reflective means has an emission characteristic approximating that of dichlorodifluoromethane.

8. An integrating nephelometer for continuously determining the wavelength dependence of the extinction coefficient due to light scattering of an aerosol, comprising an apparatus as recited in claim 1:
   (a) further including first and second filter means movably mounted, respectively, between said first and said second photoelectric detectors and said light source, each of said filter means including a plurality of optical filters, each of said optical filters screening all light but that of a distinct band of wavelengths,
   (b) wherein said comparing means further includes first and second logarithmic amplifiers amplifying said measuring and said reference signals, respectively, and a difference amplifier having said logarithmically amplified measuring and reference signals as its inputs and operative to produce said comparison signal which is proportional to their ratio,
   (c) wherein said sampling means further includes a plurality of output terminals and is operative to both sample said comparison signal to produce a sample signal and to connect said sample signal to one of said plurality of output terminals in response to a control signal on a control electrode thereof,
   (d) further including a logic means operative to sequentially move the corresponding filters of said first and said second filter means between said light source and said first and said second photoelectric detectors, to control said trigger means so that said light pulses are provided from said light source at a first instant, and to apply a control signal to the control electrode of said sampling means at predetermined intervals thereafter to thereby connect the sample signal thus obtained to a given one of said output terminals thereof, and
(e) a plurality of indicating means, each being responsive to the sample signal appearing on one of said output terminals for indicating the desired extinction coefficient at the band of wavelengths determined by the corresponding optical filter of said first and said second filter means.

9. An integrating nephelometer as recited in claim 8, to continuously provide an output signal corresponding to the exponent $\alpha$ of a power-law approximation to said wavelength dependence, further comprising:
(a) means producing a first signal proportional to the difference between the sample signals appearing on said output terminals,
(b) means producing a second signal proportional to the difference between said corresponding bands of wavelengths, and
(c) means obtaining the ratio of said first signal and said second signal to produce an output signal which is directly proportional to the exponent $\alpha$.

10. An integrating nephelometer as recited in claim 8, wherein each of said first and said second filter means comprises a rotatable wheel, and said logic means further comprises a driving motor having a shaft which is operatively connected to both of said rotatable wheels.

11. An integrating nephelometer as recited in claim 1
(a) wherein said means defining a view volume of said sample comprise a plurality of apertured discs which are aligned along the axis of said cone of observation and which are disposed within said housing, said plurality of apertured discs further functioning as a light trap for reflections of said light pulse, and
(b) further comprising a second plurality of apertured discs which are also aligned along the axis of said cone of observation and which are disposed in said housing opposite said first plurality of apertured discs.

12. An integrating nephelometer as recited in claim 11, further comprising:
(a) means continuously moving aerosol through said inlet means, said chamber, and said outlet means, and
(b) pulse generating means which synchronizes the operation of said trigger means and said sampling means by repetitively supplying thereto signals at first and at second, spaced instants, whereby a continuous series of values of the extinction coefficient is obtained.

13. An integrating nephelometer as recited in claim 12 wherein said indicating means includes first, second and third scales, respectively, marking the extinction coefficient due to light scattering, visual range through the aerosol sample, and mass concentration of the suspended particles therein, in response to said sample signal.

14. An integrating nephelometer as recited in claim 11, for measuring the changes in light scattering due to chemical interaction between the aerosol particles and a reagent, further comprising:
(a) means for introducing a reagent into said chamber, and
(b) means for varying the physical parameters of the aerosol sample.

15. An integrating nephelometer as recited in claim 11, for measuring the effects that changes in relative humidity have on light scattering due to chemical interaction between the aerosol particles and water vapor, further comprising:
(a) means for controlling the relative humidity in said chamber to a value less than 100%, and
(b) means for measuring the resultant relative humidity of said aerosol sample.

References Cited
UNITED STATES PATENTS

| | | | |
|---|---|---|---|
| 1,806,198 | 5/1931 | Hardy | 235—151.3X |
| 2,483,875 | 10/1949 | Boyer | 336—189X |
| 2,492,768 | 12/1949 | Schaefer | 356—36X |
| 2,873,644 | 2/1959 | Kremen et al. | 356—104 |
| 2,939,361 | 6/1960 | Hock | 250—218X |
| 2,967,946 | 1/1961 | Leisey | 250—218 |
| 2,990,339 | 6/1961 | Frank et al. | 356—208X |
| 3,010,308 | 11/1961 | Skala | 356—37 |
| 3,011,387 | 12/1961 | Johnson | 230—218X |
| 3,011,390 | 12/1961 | Van Luik, Jr. | 356—37 |
| 3,037,421 | 6/1962 | Bigelow et al. | 356—37 |
| 3,067,649 | 12/1962 | Szymczak | 356—189X |
| 3,100,395 | 8/1963 | Morley | 235—151.3X |
| 3,171,027 | 2/1965 | Wallack | 356—189X |
| 3,277,287 | 10/1966 | Spriggs et al. | 235—151.3 |
| 3,283,644 | 11/1966 | Saltzman | 250—218X |
| 3,315,066 | 4/1967 | Muta et al. | 235—151.3 |
| 3,363,505 | 1/1968 | Stone | 356—173X |
| 3,416,865 | 12/1968 | Townsend | 250—204X |
| 3,437,822 | 4/1969 | Fitzsimmons | 250—218 |
| 3,449,578 | 6/1969 | Keim | 356—208 |
| 3,467,475 | 9/1969 | Celio et al. | 356—188X |

FOREIGN PATENTS

| | | | |
|---|---|---|---|
| 1,094,779 | 12/1967 | Great Britain | 356—104 |

OTHER REFERENCES

Charlson et al.: Atmospheric Environment, Pergamon Press, 1967, pp. 469–478 (Great Britain).

RONALD L. WIBERT, Primary Examiner

W. A. SKLAR, Assistant Examiner

U.S. Cl. X.R.

23—230; 73—335, 336.5; 235—151.3; 250—218; 356—104, 207